R. I. PATTERSON.

Assignor to J. Boyce and T. A. Neely.

CURRY COMB.

No. 10,513. Reissued Aug. 19, 1884.

Robert I. Patterson,
Inventor.
By Chas. E. Adamson
Atty.

Witnesses:
D. Adamson
A. G. Brown

N. PETERS, Photo-Lithographer, Washington, D. C.

UNITED STATES PATENT OFFICE.

ROBERT I. PATTERSON, OF MUNCIE, INDIANA, ASSIGNOR TO JAMES BOYCE AND THADDEUS A. NEELY, OF SAME PLACE.

CURRY-COMB.

SPECIFICATION forming part of Reissued Letters Patent No. 10,513, dated August 19, 1884.

Original No. 263,428, dated August 29, 1882. Application for reissue filed May 7, 1884.

*To all whom it may concern:*

Be it known that I, ROBERT I. PATTERSON, a citizen of the United States, residing at Muncie, in the county of Delaware and State of Indiana, have invented a new and useful Curry-Comb or Brush, of which the following is a specification.

My invention relates to improvements in curry-combs; and it consists in constructing a back of wood or metal, stretching wires parallel and longitudinally with the back, securing them to the ends of said back, and making them stand about one-half inch off from the same.

The objects of my invention are to construct a cheap, simple, and durable curry-comb, and one that is inexpensive in manufacture. I attain these objects by the mechanism illustrated in the accompanying drawings, in which—

Figure 1:
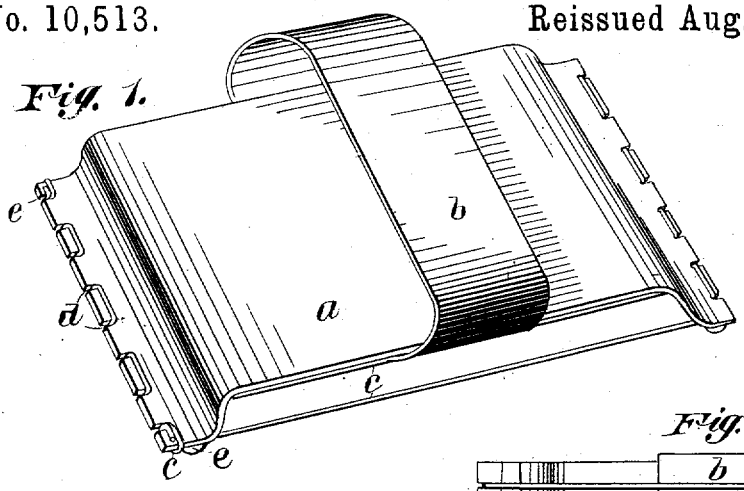
Figure 2:
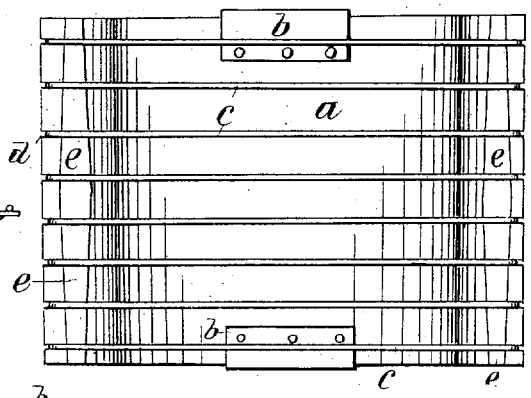
Figure 3:
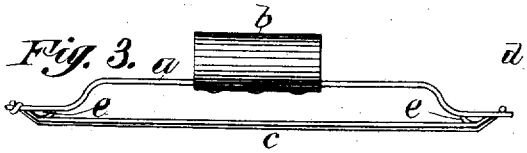
Figure 4:
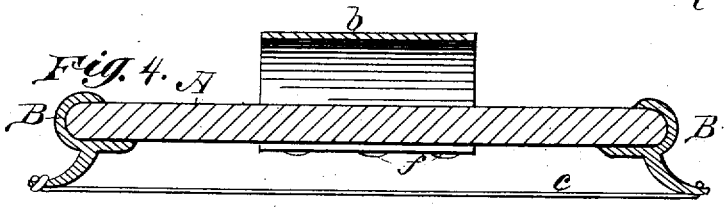
Figure 5:
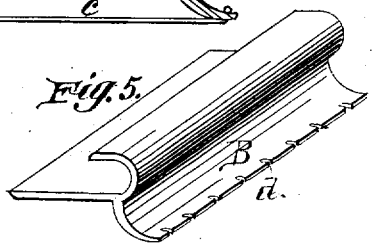
Figure 6:
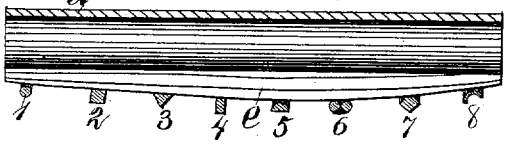

Figure 1 is a perspective view of my metallic brush or comb. Fig. 2 is a view of the wire or rubbing side, and Fig. 3 is a longitudinal edge view of the same. Fig. 4 is a modification, showing a wooden back with end clips in place of bridges. Fig. 5 is a view of the metallic end clip; and Fig. 6 is a cross-section of a metal comb, showing a number of modified forms of wires or strips.

Similar letters refer to similar parts throughout the several views.

My invention consists of a back of wood or metal having slots or notches *d* in each end handle, *b*, wire *c*, and bridge *e*, as shown in Figs. 1, 2, and 3. The wood back is made of a flat piece of wood cut the desired size, and the metal back *a* is curved downward and outward at each end, both of which are provided with holes, notches, or slots *d*, for securing and separating the ends of the wire *c*. One end of wire *c* is secured to one corner of the back, and then it is stretched across the frame back and forth, lapping it over the parts between the slots alternately, as shown in Fig. 1, until each slot is provided with a wire, as shown in Figs. 1 and 2. The end of the wire is then secured, as before described and shown, and a bridge, *e*, placed at each end of the comb between the wire *c* and the back. By pressing the said bridges outward the wires are tightened and made to stand away from the back, and the handle *b* then being riveted or otherwise secured to the back the comb is complete, as shown.

Fig. 4 represents a modification of my invention; and it consists of an end clip, B, applied to a wooden back in place of the bridge *e*, heretofore described. The wire *c*, slots *d*, and handle *b* are the same as in Fig. 1. The said clips B are made as shown in Fig. 5, and placed on each end of the back A. The wire, then being heated sufficient to make it elongate, is attached (in the slots) to the back, and in cooling it shrinks sufficient to become perfectly stretched, thus holding the end clips firmly to the back, and doing away with the bridge used in the former construction, all as shown in Fig. 4.

Various shapes and kinds of material may be used as a rubbing-surface, as shown in Fig. 6, and my invention may be used for various purposes—such as a vegetable-slicer, fish-scaler, &c.—the back being modified in shape as desired.

Having thus described my invention, I claim the following, and desire to secure the same by Letters Patent:

A curry-comb having a back of suitable material with slots *d* in each end, and wire *c*, stretched parallel with and made to stand off from said back by a bridge at each end, all constructed and combined as and for the purpose set forth.

R. I. PATTERSON.

Witnesses:

EDGAR B. TYLER,

JOHN R. JOHNSTON.